(12) United States Patent
Sani et al.

(10) Patent No.: US 6,219,101 B1
(45) Date of Patent: Apr. 17, 2001

(54) METHOD AND APPARATUS FOR VIDEO FLICKER FILTER

(75) Inventors: Mehdi H. Sani; De Dzwo Hsu, both of San Diego, CA (US); Willard K. Bucklen, Greensboro, NC (US)

(73) Assignee: Fairchild Semiconductor Corporation, Portland, ME (US)

( * ) Notice: Subject to any disclaimer, the term of this patent is extended or adjusted under 35 U.S.C. 154(b) by 0 days.

(21) Appl. No.: 09/080,056

(22) Filed: May 15, 1998

Related U.S. Application Data

(62) Division of application No. 08/730,591, filed on Oct. 15, 1996, now Pat. No. 5,786,866.

(51) Int. Cl.[7] .............................. H04N 7/01; H04N 11/20; H04N 5/21
(52) U.S. Cl. .................... 348/447; 348/910; 348/619; 382/262
(58) Field of Search .................... 348/447, 446, 348/445, 441, 618, 619, 621, 622, 623, 625, 628, 631, 630, 910; 386/124; 382/262, 263, 264, 265; H04N 7/01, 11/20, 5/21

(56) References Cited

U.S. PATENT DOCUMENTS

| | | | |
|---|---|---|---|
| 4,346,407 | 8/1982 | Baer et al. ............................ 358/149 |
| 4,488,170 | 12/1984 | Nillesen ................................ 358/26 |
| 4,700,217 | 10/1987 | Balaban et al. ....................... 358/23 |
| 4,802,009 | 1/1989 | Hartmeier ............................ 358/158 |
| 4,860,090 | 8/1989 | Murata et al. ....................... 358/21 R |
| 4,924,315 | 5/1990 | Yamashita ............................ 358/160 |
| 5,025,310 | 6/1991 | Sekiya et al. ......................... 358/19 |
| 5,068,717 | 11/1991 | Jenison ................................. 358/17 |
| 5,132,795 * | 7/1992 | Campbell .............................. 348/447 |
| 5,220,413 | 6/1993 | Jeong .................................... 358/31 |
| 5,319,451 * | 6/1994 | Sansaki et al. ...................... 348/273 |
| 5,379,077 | 1/1995 | Jack et al. ............................ 348/708 |
| 5,394,197 | 2/1995 | Kim ..................................... 348/498 |
| 5,428,456 * | 6/1995 | Parulski et al. ...................... 386/124 |
| 5,455,628 | 10/1995 | Bishop ................................. 348/446 |
| 5,475,440 | 12/1995 | Kobayashi et al. .................. 348/498 |
| 5,515,108 | 5/1996 | Kim ..................................... 348/498 |
| 5,526,055 | 6/1996 | Zhang et al. ......................... 348/510 |
| 5,742,349 * | 4/1998 | Choi et al. ............................ 348/447 |
| 5,936,621 | 8/1999 | Medin et al. ......................... 345/213 |

OTHER PUBLICATIONS

Raytheon data sheet,*TMC2360 Video Output Processor VGA to NTSC/PAL*, Raytheon Electronics Semiconductor Division, 1996, 24 pages.

* cited by examiner

*Primary Examiner*—Michael Lee
(74) *Attorney, Agent, or Firm*—Skjerven, Morrill, MacPherson, LLP

(57) ABSTRACT

A VGA to analog video converter is useful e.g. for displaying video and/or graphics data from a computer onto a large screen television or television monitor. The RGB video signals output from the personal computer are first converted to digital form. The analog-to-digital converter which does this is clocked by a clock signal generated by a phase-locked loop using the horizontal synchronizing signal from the personal computer. The digital RGB signals are then converted to a YCbCR format. A flicker filter eliminates the flickering appearing on the TV monitor by operating on the luminance (Y) component. The YCbCr signals are encoded into NTSC or PAL Standard, and output in composite analog video or S-VHS format. A color subcarrier synthesizer generates the color subcarrier signal to generate an accurate subcarrier frequency for the video output signals. An analog-to-digital clock phase adjustment is used to ensure that the input RGB signals are sampled at the proper instant by the analog-to-digital converters.

9 Claims, 6 Drawing Sheets

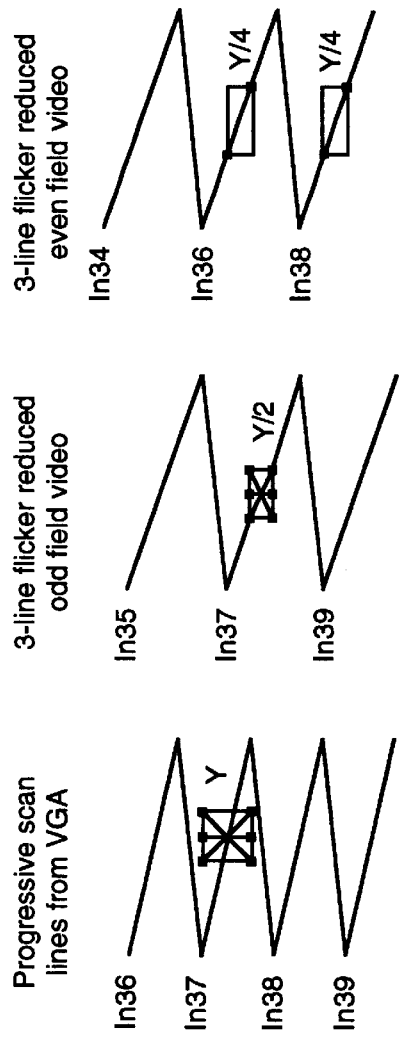
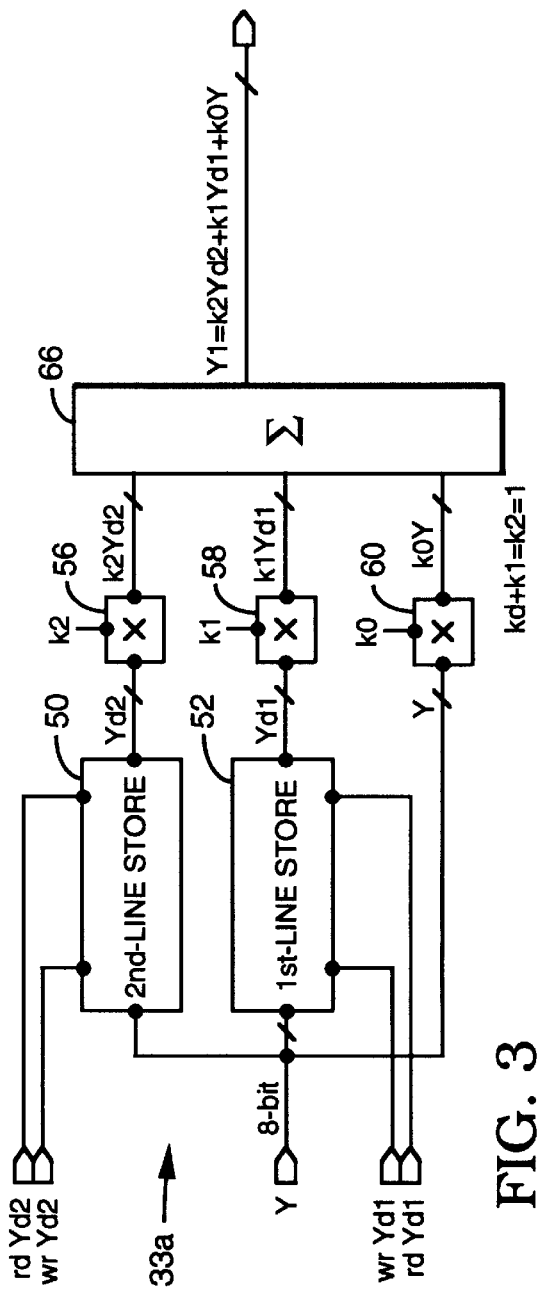
FIG. 2A
FIG. 2B
FIG. 2C
FIG. 3

METHOD AND APPARATUS FOR VIDEO FLICKER FILTER

This application is a divisional application of U.S. Ser. No. 08/730,591, filed Oct. 15, 1996, now U.S. Pat. No. 5,786,866 issued Jul. 28, 1998.

BACKGROUND OF THE INVENTION

This invention relates to video signal processing and more specifically to converting video signals from a format (such as RGB) having sequential scanning to an interlaced scanning format as used in composite video (television).

DESCRIPTION OF THE RELATED ART

As well known, the video signal format in a computer is not directly compatible with the video signal format used in composite video, e.g. television. Thus it is not possible to directly couple computer video signals into a television set or other television-standard video device, even though it is advantageous to convert computer video signals into signals that may be used for recording to a video cassette recorder or for a display on a television monitor, for instance a large screen monitor.

A personal computer (PC) typically outputs red, green, blue (RGB) analog video signals in a progressive scanning format. These RGB signals are typically the type generated by a VGA controller in the personal computer for driving a PC monitor. In contrast, a television device accepts video input in composite video (or sometimes S-VHS video) format which uses interlaced scanning, whereby in each video field only every other line is scanned, and two complete video fields are one frame. Thus it is known to be useful to convert computer images or graphics data for instance in the RGB format into an analog television NTSC or PAL or S-VHS standard signal. One such converter is described in Zhang et al., U.S. Pat. No. 5,526,055 issued Jun. 11, 1996. (U.S. Pat. No. 5,526,055 is not acknowledged herein as prior art to the present application, but is exemplary of video converters.) See also U.S. Pat. No. 5,455,628, issued Oct. 3, 1995, to Bishop, incorporated herein by reference, also disclosing such a converter.

However, the present inventors have determined that the performance of known video converters is inadequate in terms of video signal processing, and improvements are needed to provide a better output television image.

SUMMARY

In accordance with this invention, an RGB to composite video converter includes a flicker filter to essentially eliminate the flicker in the luminance component of the composite video, which otherwise would appear in the television image. The flicker filter accepts input signals in the YCbCr format and eliminates flickering by averaging the pixels, with minimum memory component requirements. The flicker filter incorporates a user control to perform a three line, two line or no filtering.

The color subcarrier signal, which is needed in such a converter to convey the color information, is itself generated by a digital frequency synthesizer.

Each of the digitized RGB signals is generated by a digital to analog converter from a digital signal source in a personal computer. Its waveforms are staircase-like and its level transitions along with the digital to analog converter clock signal in the PC. The analog to digital converters in the present video converter include a clock phase adjustment feature to provide optimum sampling of the RGB input video signals. Adjusting the phase of the analog to digital converters' clock signal enables the input signal to be sampled when its input level is not in transition, so as to properly convert the signals into digital form.

BRIEF DESCRIPTION OF THE DRAWINGS

FIGS. 2A, 2B and 2C show operation of the present flicker filter.

FIG. 3 shows a block diagram of the present flicker filter.

DETAILED DESCRIPTION

1. VGA to Composite Video Converter

Figure 1A:
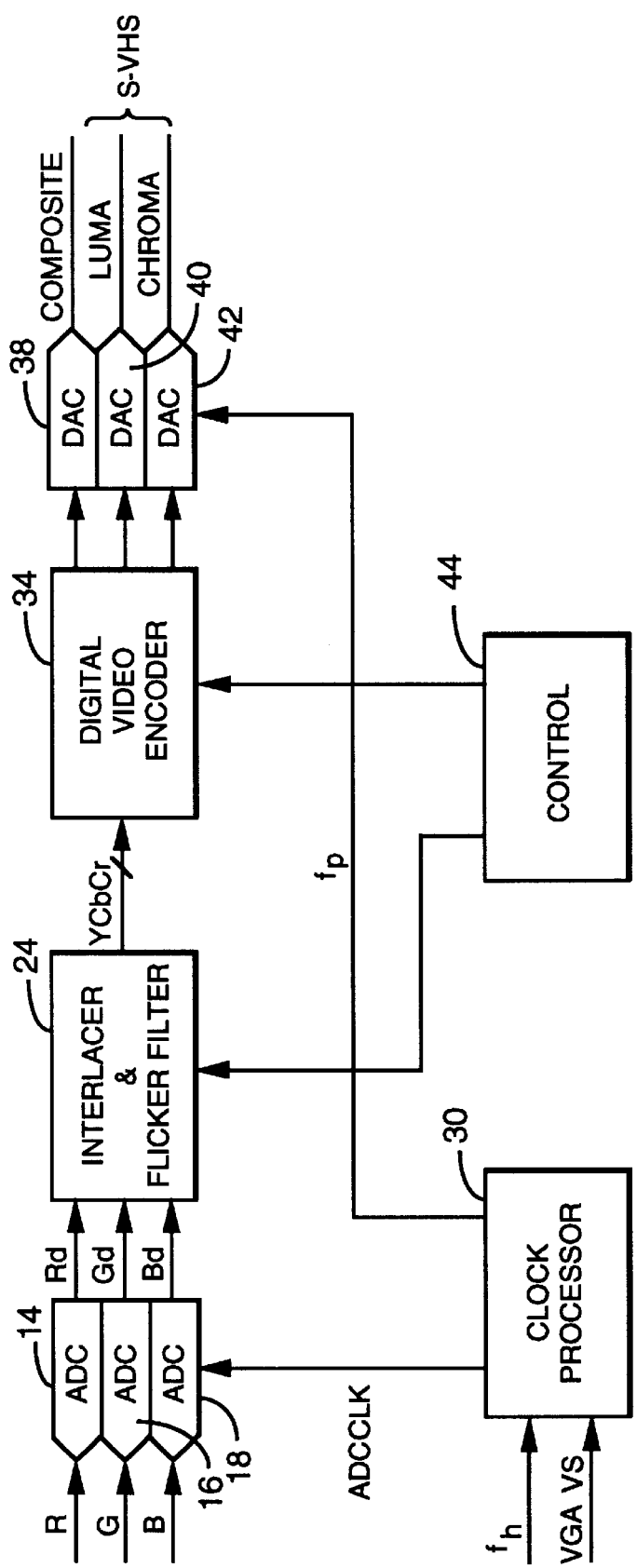
FIG. 1A shows a block diagram of the present video converter.

FIG. 1A is a block diagram of an RGB to composite video converter in accordance with this invention. The RGB signals are provided conventionally, for instance from a personal computer (PC), and are in e.g. the well known RGB format. The R, G, and B components are applied respectively to 8-bit analog to digital converters 14, 16, and 18, further detail of which is provided below. The resulting digitized signals Rd, Gd, Bd, are coupled to an interlacer and flicker filter 24. The analog to digital converters (ADCs) 14, 16, 18 are each timed by an ADC clock signal ADCCLK provided from the clock processor 30 using a phase locked loop. (Further detail of this clock signal generation is also provided below.) Input signals to the clock processor 30 include the VGA horizontal sync signal fh and the VGA vertical sync signal VGAVS from the PC.

One portion of block 24 converts the progressive scan digitized Rd, Gd, Bd signals into the YCrCb format. The flicker filter operates on the Y and CbCr components. The signals are then converted into interlaced form. Digital video encoder 34 then converts these digitized YCbCr signals into NTSC or PAL standard luma and chroma signals. The desired composite or S-VHS video format is selected, for instance by the user, as the output signal. A second phase locked loop in clock processor 30 generates the pixel clock fp signal used by the digital video encoder 34.

The interlacer circuit portion of block 24 of FIG. 1A in one embodiment uses a RAM (random access memory) to perform the function of a FIFO. See also for instance U.S. Pat. No. 4,200,887, to Van Denavoort, and No. 4,386,367, to Peterson et al., showing a noninterlaced to interlaced signal converter for video which is alternatively suitable for the present interlacer circuit.

The digital video encoder 34 generates the composite video vertical and horizontal synchronizing pulses for insertion into the YCrCb signal to create the composite or S-VHS video signals in NTSC or PAL format from the YCrCb signals from block 24.

Digital video encoder 34 also contains a color subcarrier digital frequency synthesizer. This subcarrier signal is provided, as described below, so as to have an accurate subcarrier frequency which is necessary for television. The NTSC (or PAL) YCbCr signal components from digital video encoder 34 are applied to three 9-bit digital to analog converters 38, 40 and 42 which output respectively composite video, the luma component and the chroma component (for S-VHS video). A control logic block 44 provides a user interface, for instance for selecting whether the output video signals are to conform to NTSC or PAL television standard, and also to provide other user controlled functionality as described below.

This video converter in one embodiment is available commercially from Raytheon Electronics as part number TMC2360 "Video Output Processor VGA to NTSC/PAL". Its functionality is described in the published specification sheet for that part, incorporated herein by reference.

Figure 1B:
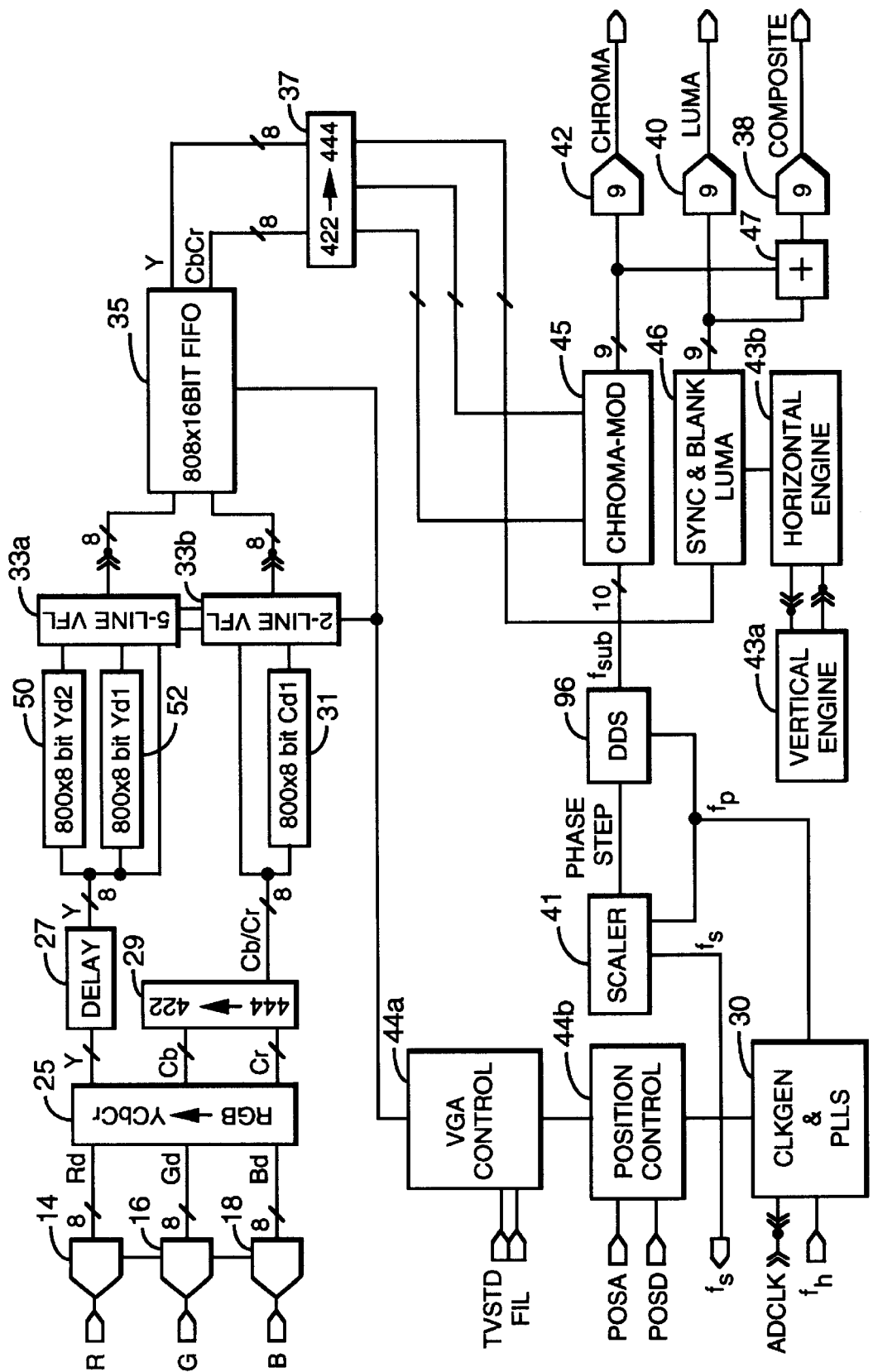
FIG. 1B shows a more detailed block diagram of the video converter of FIG. 1A.

A more detailed block diagram of the structure of FIG. 1A is shown in FIG. 1B. Many of the elements of FIG. 1B are similar to those depicted in FIG. 1A. The small numbers next to the lines in FIG. 1B indicate the actual number of lines, i.e. a bus, where appropriate. The analog-to-digital converters 14, 16, and 18 output 8-bit digitized signals Rd, Gd, Bd to the RGB-to-YCbCr converter 25, which is conventional. Due to the difference in sampling frequencies required, since the Y component is sampled at a higher frequency than the Cb or Cr Components, the Y signal is subject to delay by delay element 27 while the Cb and Cr components are subject to the 444 to 422 conversion 29 in order to drop every other sample of the Cb and Cr components.

The next elements are the flicker filters. The three scan line flicker filter for the Y component includes an 800×8-bit line store 50, i.e. FIFO memory, and a second similar line store 52. Output signals from line stores 50, 52 are respectively designated as Yd2 and Yd1, and are coupled to the remaining portion of the Y component flicker filter which is multiplier-adder 33a explained in further detail below. A two scan line flicker filter for the Cb/Cr video components includes a single 800×8-bit line store 31 outputting a signal Cd, to a multiplier-adder 33b.

Each of the flicker filter multiplier-adder elements 33a and 33b outputs a signal which is coupled to an 800×24-bit FIFO 35 which performs the interlacing function. Note that there is no frame buffer herein for interlacing.

The interlacer FIFO 35 outputs the Y and CbCr components to a 422 to 444 converter 37. These components are then coupled to the elements corresponding to the digital encoder of FIG. 1A, which in FIG. 1B include the chroma modulator 45 and the sync and blank luma circuit 46 which are conventional for converting the Y and CbCr components into NTSC or PAL television.

As shown in FIG. 1B, the logic control block 44 of FIG. 1A has two portions, of which one is the VGA control 44a which receives two user control signals, TVSTD which determines the television standard (NTSC or PAL), and FIL which controls the flicker filter as described further below. Other user control functions may also be provided.

The position control logic 44b receives two control signals, POSA and POSD, to position the picture on the screen in terms of up, down, left, right and is conventional. The clock processor block 30 of FIG. 1A is shown in more detail in FIG. 1B as including both a clock generator and phase locked loops (PLL).

The subcarrier frequency generator (which in FIG. 1A is part of DVE 34) as shown in FIG. 1B includes scaler 41 and direct digital frequency synthesizer (DDS) 96 receiving a fixed clock signal fs which is an external reference signal. A phase step signal from the scaler 41 is coupled to the DDS 96. A vertical engine 43a and a horizontal engine 43b generate the horizontal and vertical synchronization signals used in composite video and are in turn coupled to the remaining portions of the digital video encoder for inserting the horizontal and vertical synchronization signals into the video.

As is conventional, the chroma modulator 45 outputs the chroma component and the synch and blank luma circuit 46 outputs the luma component to respectively digital-to-analog converters 42 and 40. Additionally, a composite video signal is provided by summer 47 adding the chroma and luma to form composite video which is output to digital-to-analog converter 38.

2. Flicker Filter.

The flicker filter, as described above, overcomes the well known flickering problem. See for instance U.S. Pat. No. 4,924,315 issued May 8, 1990 to Yamashita describing flickering and a flicker filter, and incorporated herein by reference. U.S. Pat. No. 5,455,628, referred to above, shows in its FIG. 2 a transversal filter acting as a vertical filter to reduce interlace flicker. Again, this uses several line stores connected in series and, in fact, requires four line stores.

The flicker phenomena is shown in present FIGS. 2A, 2B and 2C where the flickering is illustrated as the small block shown in the middle of various progressive scan lines (in the RGB format). The scan lines are labelled numerically. In this progressive (non-interlaced) scan the horizontal scan lines are scanned in series in order, for instance lines 36–39, from top to bottom. The video signals of one frame are stored in a frame memory in the conventional interlacer of FIG. 1A. After that, the odd horizontal scanning lines are read out from the frame memory, for instance scan lines 35, 37, 39 and they constitute part of the first video field. Similarly the second video field comprises the even scan lines for instance including scan lines 34, 30, etc.

However, when there is an isolated luminance signal (Y) which is shown as a small block in a specific horizontal scanning line for instance in line 37, the luminance signal Y is present in the first field but not in the second field. For NTSC TV, the frame time period is 1/30th second, so the luminance signal is present every 1/30th of a second and is observed by the television viewer as an undesirable flicker. A similar problem occurs in PAL television at intervals of 1/30th second.

Yamashita discloses a flicker filter for eliminating this flicker phenomena using two line stores connected in series in his FIG. 1, where the first line store provides at its output terminal the line data to the second line store. Another flicker filter is disclosed in U.S. Pat. No. 5,455,628, referenced above.

The present inventors have developed an improved flicker filter using minimum memory requirements, and moreover which can selectively perform three line, two line or no flicker filtering. Present FIG. 2A shows respectively the progressive scan lines from a VGA source exhibiting the flickering. FIGS. 2B and 2C show respectively a three line filtering process reducing the odd field video flicker and a three line filtering process reducing the even field video flicker, both in accordance with this invention. As shown in FIG. 2B, the flickering is eliminated by reducing the luminance Y to only one half what it is in (unfiltered) FIG. 2A, and inserting one quarter of Y in lines 36 and 38, as shown in FIG. 2C.

The present flicker filter for filtering the Y (luminance component) is shown schematically in FIG. 3; this corresponds to elements 50, 52 and 33a in FIG. 1B. The two-line flicker filter having elements 31 and 33b for the Cb/Cr components of FIG. 1B is not shown in further detail but is similar to that of FIG. 3 except for having only a single line store.

The input signal to the Y component flicker filter of FIG. 3 is the digitized luminance (luma) Y component from the RGB to YCbCr converter 25 of FIG. 1B. Also provided as shown in FIG. 3 are the read and write signals to the first line store 52, respectively rd Yd1, wr Yd1, and the read and write signals to the second line score 50, respectively rd Yd2, wr Yd2. In this embodiment the luminance component Y is an 8-bit signal, but this is not limiting.

To achieve flicker filtering, in the odd numbered video fields the odd numbered video scan lines are written into the first line store 52 and the even scan lines are written into the second line store 50, on command of the read and write signals. Hence when the current scan line is an even numbered line, its luminance value Y is multiplied by the coefficient k0 by multiplier 60. The first line store 52 reads out the previous line Yd1, which is multiplied by coefficient k1 by multiplier 58. The second line store 50 reads out the previous even numbered line Yd2, which is multiplied by the coefficient k2 by multiplier 56. As the second line store 50 has its data Yd2 read out, the current even line is written into line store 50. Hence the filter output signal Yf from adder 66 is valid during the even scan lines.

In even numbered fields, the even numbered scan lines are written into the first line store 52 and the odd numbered scan lines into the second line store 50, and the output signal Yf of the summer 66 is valid also during the odd lines. Thus for instance if the filter coefficients are chosen so that k0 equals 0.25, k1 equals 0.5 and k2 equals 0.25, the multipliers 56, 58, 60 right shift by 2, 1 and 2 respectively. In this flicker filter, the Y signals are written directly to the first and the second line stores at the proper line times, and there is no need to couple the output of the first line store as an input into the second line store; also advantageously only two line stores are needed.

The flicker filter of FIG. 3 (under user control) operates in three modes: off, high filtering, and medium filtering. The user control is by control logic block 44a and is achieved by programmably setting the filter coefficient values as follows for the off, medium filtering (2 line filter) and high filtering (3 Line filter):

|    | OFF | MF  | HF   |
|----|-----|-----|------|
| k0 | 0   | 0.5 | 0.25 |
| k1 | 1   | 0.5 | 0.5  |
| k2 | 0   | 0   | 0.25 |

3. Color Subcarrier Signal Generator

The present converter includes a color subcarrier signal generator. As is well known, in color television the color subcarrier signal serves as a reference for the color; the frequency and phase of this subcarrier signal are critical for color reproduction. Therefore, it is necessary to synchronize the color televisions receiver's local 3.58 MHz oscillator (in NTSC TV) so that its frequency and phase are in step with the subcarrier signal at the signal transmitter. Synchronization is accomplished by transmitting a burst of the transmitter's 3.58 MHz color subcarrier during the horizontal blanking period. This color reference signal is often referred to as the color burst and typically includes 8–10 cycles of the 3.58 MHz (in NTSC television) subcarrier signal.

Hence, a composite video signal in NTSC or PAL includes a color burst, which is a small portion of the color subcarrier signal. No such color burst is present in RGB (VGA-type) video. It is necessary to provide a color burst signal to form a composite video, and also it is critical that the color burst signal be accurate (in terms of phase and frequency) within a tight tolerance in accordance with NTSC or PAL television standards; otherwise, the color is not properly reproduced by a television set.

Figure 4:
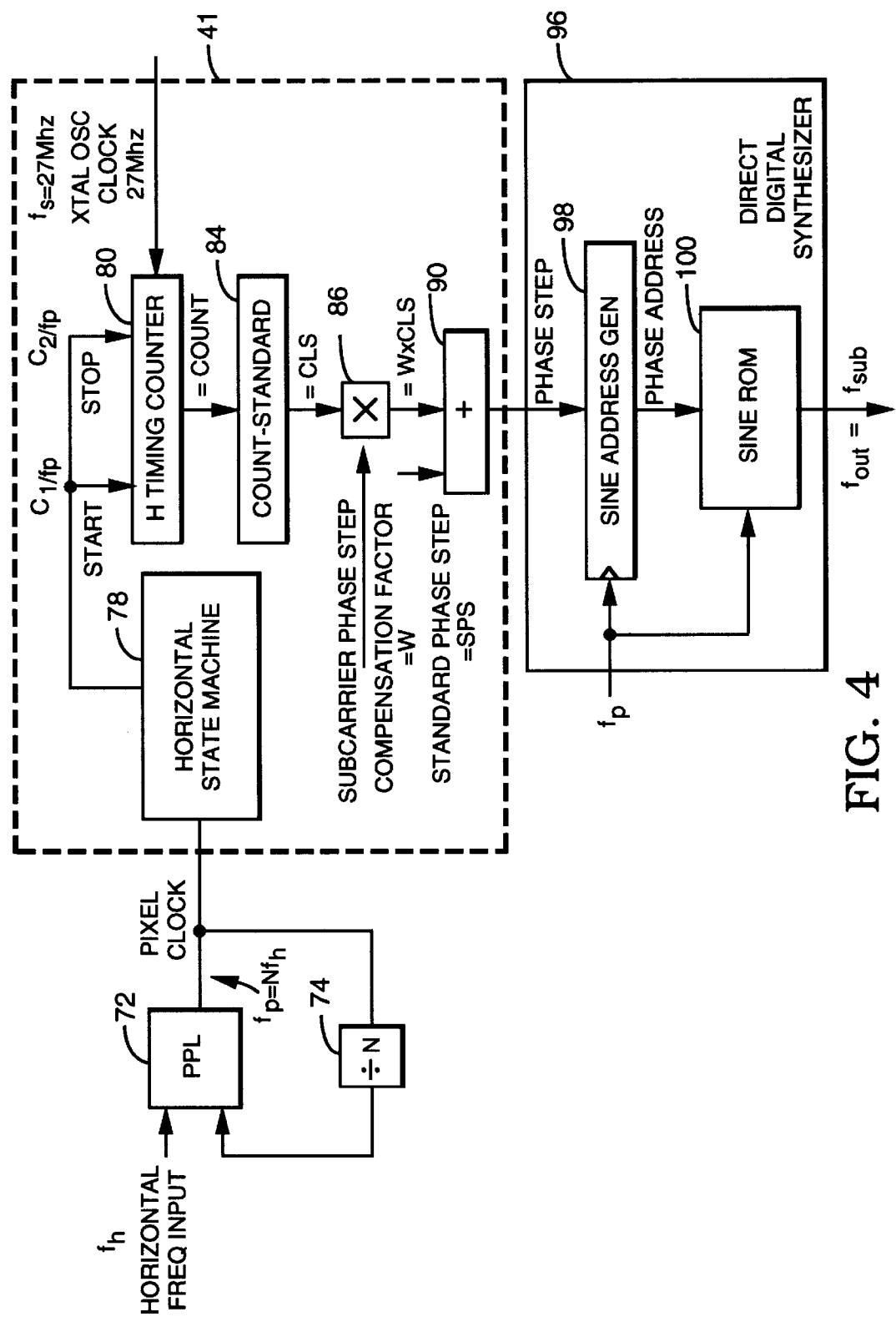
FIG. 4 shows a block diagram of the present color subcarrier signal generator.

FIG. 4 shows, in a detailed block diagram, the present color subcarrier generator also shown in FIG. 1B. Each of the individual elements shown in FIG. 4 is conventional. This subcarrier signal generator has two main portions, the scaler 41 and the DDS 96. The scaler 41 measures the inaccuracy (error) of the horizontal synchronization signal fh frequency and outputs a phase step signal to the DDS. An externally supplied fixed clock signal fs is used by the scaler 41 to count the error signal.

This subcarrier signal generator operates as follows: A DDS (direct digital synthesizer) is used to generate the proper subcarrier signal. The frequency generated by a DDS is equal to a constant number times the frequency of the DDS clock signal. Since the pixel clock signal is generated by a phase locked loop using the horizontal synchronization signal as a reference, its frequency accuracy equals that of the horizontal synchronization signal. Since, undesirably, the horizontal synchronization signal fh from a personal computer has a wide frequency tolerance, therefore, the pixel clock also has a wide frequency tolerance.

A stable frequency fs, e.g. 27 MHz, is used to detect the frequency inaccuracy or error of the horizontal synchronization signal fh from the personal computer. The detected error is used to modify the constant number, so as to insure that the DDS 96 outputs an accurate subcarrier signal. This also allows the DDS 96 to generate different and accurate subcarrier frequencies fout, for instance for both NTSC and PAL television standards, from the relatively inaccurate horizontal synchronization signal fh from the personal computer.

The following explains the subcarrier signal generator of FIG. 4. The pixel clock signal fp is generated by a phase locked loop (PLL) 72 using the horizontal synchronization frequency fh, where fp=N*fh, and N is a constant much greater than 1, in divider 74.

The horizontal state machine 78 generates a start clock signal at C1/fp and a stop clock signal at C2/fp, where C1, C2 are constants and C2>C1. The H (horizontal) timing counter 80 is clocked by an accurate clock signal fs from an external crystal oscillator fs. The number of fs is counted within a count window of (C2−C1)/Fp seconds.

The H timing counter 80 output=fs*(C2−C1)/fp; fs is any convenient fixed frequency, e.g. fs=27 MHz.

A fixed number designated "Standard" is subtracted from the count number by the Count–Standard subtractor 84. This number, after normalization, is used to maintain the accuracy of the frequency generated by the direct digital frequency synthesizer (DDS) 96 so that:

$$CLS=Count-Standard=fs*(C2-C1)/fp-Standard$$

If the fh frequency s accurate, then no frequency correction is required and the value of CLS should equal zero. An accurate fh frequency is related to the subcarrier frequency fsub by fh=fsub/N1. N1 is a fixed constant determined by the video standard (NTSC or PAL). Then:

$$CLS=fs*(C2-C1)/fp-Standard=0,$$

if:

$$fp=N*fh=N*fsub/N1$$

From the above two equations, the Standard value can be determined by:

$$Standard=fs*(C2-C1)*N1/(N*fsub)$$

The value of CLS is normalized before applying it to the DDS 96. The normalized value of CLS=W*CLS (from multiplier 86) is added to a "Standard Phase Step" value SPS to become the Phase Step, where Phase Step=SPS+W*CLS.

The output frequency fout of the DDS 96 is determined by:

$$fout = C3*fp*\text{Phase Step} = C3*fp*[SPS + W*CLS]$$
$$= C3*fp*\{SPS + W*fs*(C2 - K1)/fp - W*\text{Standard}\}$$
$$= C3*fp*SPS + C3*W*fs*(C2 - C1) - C3*fp*W*\text{Standard},$$

where C3=a constant determined by the number of bits used in the DDS 96.

To insure that the value fout would not change due to variations in fh or fp=N*fh, it is required that: the derivative of fout with respect to fp is equal to zero, i.e.:

d(fout)/d(fp)=0 or C3*SPS−C3*W*Standard=0.

The normalization factor W=SPS/Standard The value of SPS is determined by setting CLS=0 when fout=fsub.

Then:
SPS=[fsub/C3]/fp=[fsub/C3]*[N1/N*fsub]
or SPS=N1/[C3*N]

Direct digital synthesizer 96 includes a sine address generator 98, which receives the phase step signal from adder 90, and which generates a phase address which addresses the sine read only memory (lookup table) 100. The output of the sine ROM 100 is the desired color subcarrier frequency fout.

4. Analog to Digital Converter Clock Signal Generator

The present inventors have also found that to provide optimum sampling of the RGB analog input signals, an analog to digital converter clock signal phase adjustment is desirable. Each of the RGB signal components is originally generated by a digital to analog converter from a digital source in the personal computer. Hence these RGB signals, although they are analog signals, have a staircase-like form and transition in level in synchronization with the digital to analog converter clock signal in the personal computer. To digitize these staircase-like signals, it is required to sample these signals when their levels are stable. Hence an analog to digital converter clock phase adjustment is used to enable the RGB input signals to the present video converter to be sampled by the analog to digital converters at a time when their input level is not changing; this insures that the RGB input signals are properly converted into digital format.

Figure 5:
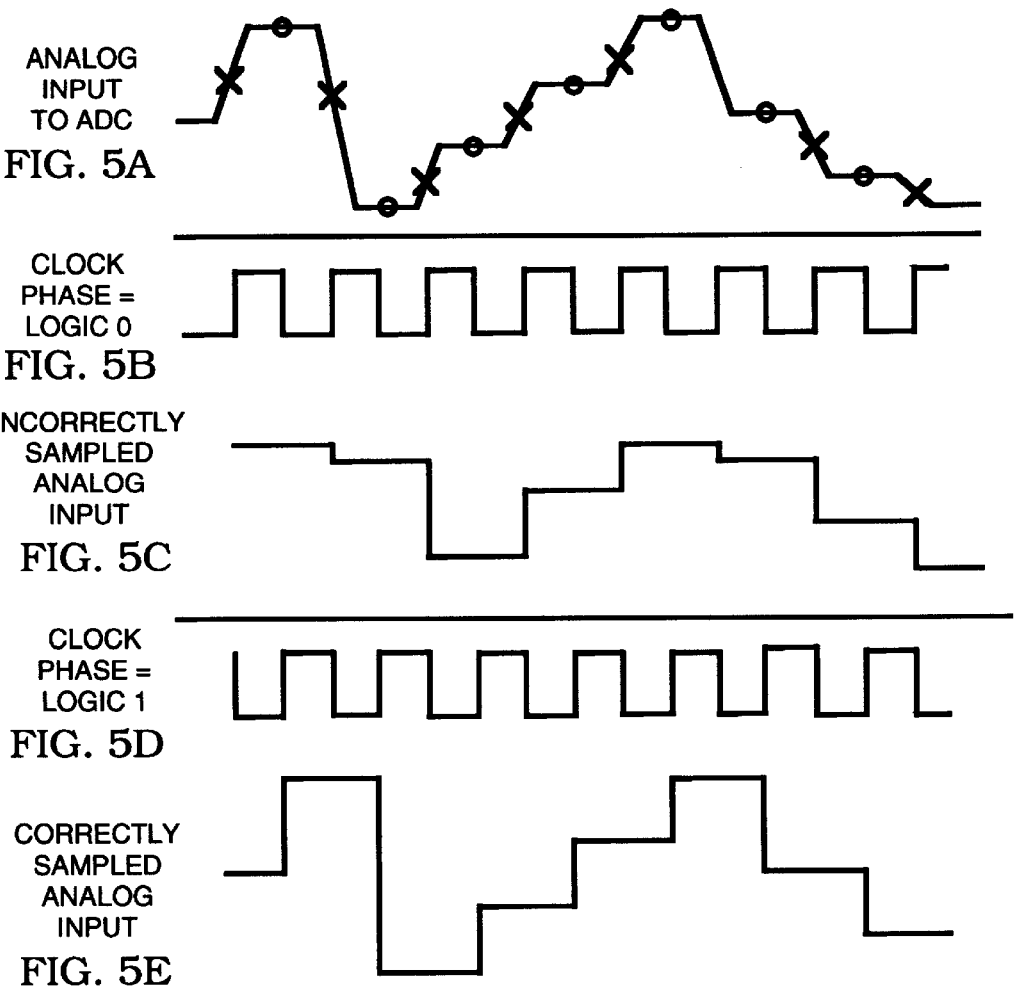
FIGS. 5A–5E show waveforms illustrating the present analog to digital converter clock signal with phase control.

This problem and the present solution are illustrated by the waveforms in FIGS. 5A–5E. FIG. 5A shows the analog signal input to e.g. ADC 14 of FIG. 1A, for instance one R, G or B component, with the amplitude of the signal on the vertical scale and time on the horizontal scale. In the FIG. 5A waveform, the level portions of the signal are designated by o's and the transition portions by x's. The staircase-like form is a result of the fact that this signal, although it is in analog form, was originally generated by the digital-to-analog converter in e.g. a personal computer. FIG. 5B shows in the prior art a clock signal used for sampling in the analog digital converters for converting the RGB signals into digital RGB signals. In this case, the clock signal's rising edge could occur at the analog transition. Since the sampling occurs on the rising edge of each clock pulse, the sampling actually occurs during the transition, i.e. at the x's. The undesirable result of this is shown in FIG. 5C, having an incorrectly sampled analog input signal which, when converted to digital form, will have the share shown in FIG. 5C which is very different from the shape of the actual original signal of FIG. 5A. Hence, this shows the problem of incorrect sampling due to an incorrect ADC clock phase.

The present inventors therefore have found it is important to sample on the level portions of each pixel and not on the transitions. The difference between proper in-phase sampling and improper out-of-phase sampling can be profound. Consider a limiting case of alternating black and white vertical stripes each one pixel wide. If sampled on the level portions, i.e. the "flat tops" of each pixel, the digitized values will be the correct "picket fence" image. If sampled incorrectly, i.e. during black to white transitions, the samples would be a flat gray, with neither black nor white stripes visible.

FIGS. 5D and 5E show the solution in accordance with this invention. FIG. 5D shows a clock signal with the leading edge of each clock pulse synchronized with the o's in FIG. 5A. This results in the corresponding correctly sampled signal of FIG. 5E which closely corresponds to the analog input signal of FIG. 5E, i.e. is correctly sampled and hence properly reproduces the original signal for purposes of analog to digital conversion.

Figure 6:
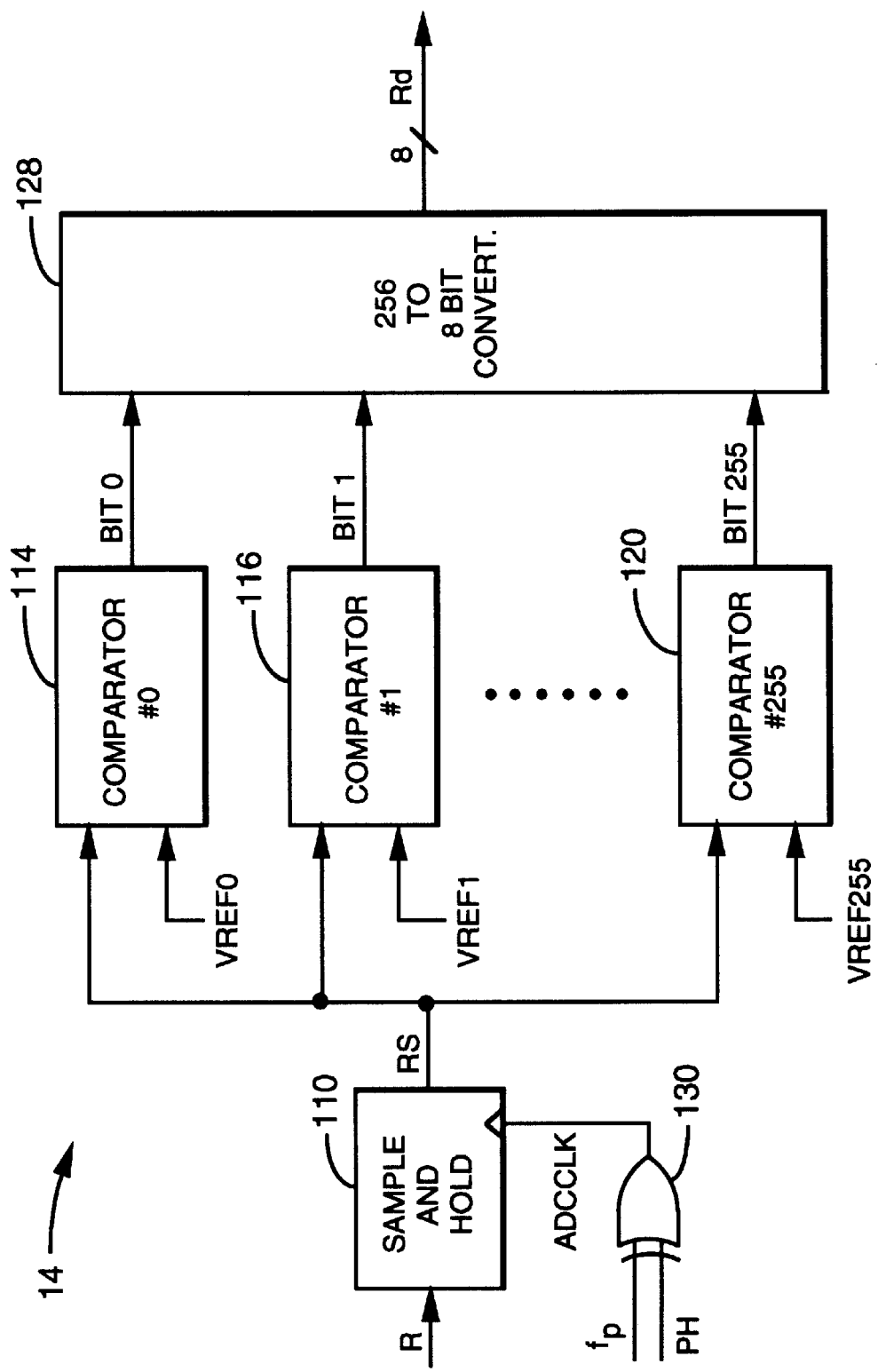
FIG. 6 shows a block diagram of the present analog to digital converter with phase control of its clock signal.

FIG. 6 shows an analog to digital converter 14 which functions in accordance with FIGS. 5D and 5E and is any one of analog to digital converters 14, 16, or 18 of FIG. 1A. It is understood that these analog to digital converters typically are identical and one is provided for each of the RGB channels; only one of these analog to digital converters is shown in FIG. 6. The R analog video component from the personal computer is applied to a conventional sample and hold circuit 110. The sampled output signal, here designated Rs, is then coupled in parallel to a set of 256 comparators, of which only comparators 114, 116, and 120 are shown, the others being omitted. Each comparator has its own voltage reference level, designated VREF0, VREF1, . . . , VREF255, so as to provide 256 comparison levels. Each comparator outputs a bit, here labeled bits 0–255, to a 256-bit digital converter 128 which outputs the 8-bit digitized output signal Rd.

While this analog to digital converter is in most respects conventional, its clocking is unique. The clock signal, rather than having the phase shown in FIG. 5B, is instead the in-phase clock signal of FIG. 5D. The original pixel clock signal fp which is used in the prior art for clocking the analog to digital converter is applied, along with a phase control signal PH, to the input terminals of exclusive-OR gate 130, which in response generates the phase adjusted clock signal ADCCLK to the clock terminal of the sample and hold circuit 110. (The pixel clock signal fp is, as shown in FIG. 4, generated by the PLL 72 using the horizontal synchronizing signal fh.) The phase control signal PH is for instance set manually by a toggle switch while viewing the resulting television picture, so as to optimize the picture.

While the present disclosure is directed to a VGA to composite video converter, this is not limiting; some of the various features described herein may be used independently and they may be used in other contexts, where appropriate. For instance, the present color subcarrier generator may be used in other applications where it is important to generate an accurate subcarrier signal, without for instance the phase adjustment of the analog to digital converter clocking. Similarly, the present flicker filter may have applications other than in a video converter of the present type. Hence, the present disclosure is not limiting; further modifications will be apparent to one skilled in the art in the light of this disclosure and are intended to fall within the scope of the appended claims.

We claim:

1. A flicker processing circuit comprising:

an input terminal for receiving a progressive scan luminance video signal;

first and second line stores each having an input port coupled in parallel to the input terminal and each having an output port; and a summer having three input ports respectively coupled to the output ports of the first and second line stores and to the input terminal, there being no line store coupled between the third input terminal of the summer and the input terminal;

wherein each of the first and second line stores has a read command input terminal and a write command input terminal, and commands are supplied to the read and write command input terminals, wherein an odd numbered video scan line is written into the first line store and an immediately following even numbered video scan line is written into the second line store for an odd numbered video field in response to the commands; and an even numbered video scan line is written into the first line store, and an immediately following odd numbered video scan line is written into the second line store, for an even numbered video field in response to the commands.

2. The circuit of claim 1, further comprising first and second multipliers coupled between respectively the output ports of the first and second line stores and the summer, and a third multiplier coupled between the input terminal and the third input terminal of the summer, wherein each multiplexer has an input terminal for receiving a coefficient and multiplies the coefficient by a signal received from respectively the output ports of the first and second line stores and the input terminal.

3. The circuit of claim 2, wherein a sum of the coefficients is equal to 1.

4. The circuit of claim 1, wherein the input terminal is an 8 bit parallel data port.

5. The circuit of claim 1, wherein each line store is a FIFO memory.

6. The circuit of claim 2, further comprising means for programmably selecting the coefficients.

7. A method for removing flicker from a luminance component of a progressive scan video signal, comprising:

storing in response to a first write command a luminance component of a first video scan line of the progressive scan-video signal in a first line store;

storing in response to a second write command a luminance component of a second immediately following video scan line of the video signal in a second line store without the luminance component of the second scan line first being stored in the first line store;

forming a weighted sum of the luminance components of the stored video scan lines and a luminance component of a third video scan line immediately prior to the first video scan line in response to first and second read commands, wherein the luminance component of the third video scan line is not stored in a line store coupled in parallel with the first or second line stores;

writing an odd numbered video scan line into the first line store and writing an immediately following even numbered video scan line into the second line store for an odd numbered video field; and writing an even numbered video scan line into the first line store, and writing an immediately following odd numbered video scan line into the second line store, for an even numbered video field.

8. The method of claim 7, wherein the forming includes providing coefficients for weighting the sum.

9. The method of claim 8, further comprising programmably selecting the weighting coefficients.

* * * * *